April 8, 1969 P. I. PEYCHÉS ET AL 3,437,469
PROCESS AND APPARATUS FOR SUPPORTING A SHEET OF GLASS ON
A GAS AND LIQUID SUPPORT BED
Original Filed March 5, 1964

INVENTORS
PIERRE IVAN PEYCHÉS
MAURICE BOURGEAUX
BY Bauer and Seymour
ATTORNEYS

United States Patent Office 3,437,469
Patented Apr. 8, 1969

3,437,469
PROCESS AND APPARATUS FOR SUPPORTING A SHEET OF GLASS ON A GAS AND LIQUID SUPPORT BED
Pierre Ivan Peychés and Maurice Bourgeaux, Paris, France, assignors to Compagnie de Saint-Gobain, Neuilly-sur-Seine, France
Continuation of application Ser. No. 349,726, Mar. 5, 1964. This application Aug. 16, 1967, Ser. No. 661,129
Claims priority, application France, Mar. 8, 1963, 927,394
Int. Cl. C03b 39/00, 29/04
U.S. Cl. 65—25                                       5 Claims

ABSTRACT OF THE DISCLOSURE

A sheet of glass in the process of formation is supported out of contact with solid objects by the joint use of liquid metal lands and open-ended grooves under substantially uniform gas pressure. The problem of maintaining uniform pressure in a groove of open ends is solved.

---

This application is a continuation of application Ser. No. 349,726 filed Mar. 5, 1964, now abandoned.

This invention is directed to a process and apparatus for supporting a sheet of glass for movement along a path while holding the glass out of contact with any solid surfaces which might damage the surfaces of the same.

It is well known in the prior art that a rigid sheet of material such as a sheet of glass can be maintained, while it is being conveyed, on a gaseous cushion produced by a continuous flow of pressurized gas supplied from nozzles positioned under the sheet to be supported. It is also well known that this process of continually flowing pressurized gas under the sheet presents practical difficulties in its application due mainly to the general instability of the operating conditions in such a system. In such a system, the gaseous cushion is usually confined between the sheet and a parallel flat surface. If the thickness of the gaseous cushion is temporarily elevated under a certain region of the sheet, for example along one side thereof, the gas will escape more easily on that side. As the gas cushion escapes more easily on that side the pressure supporting the sheet diminishes and that side of the sheet will drop to a level below that of the rest of the sheet. Such prior apparatuses have sufficient pressure supplied to the gaseous cushion to quickly form a new cushion so that the affected side of the sheet rises again. Due to the rigidity of the sheet the action of the one side of the sheet falling and rising relative to the other side of the sheet causes an inverse reaction on the other side of the sheet. The result is that the sheet moves in a manner comparable to the slapping of a flag in the wind. While this instability is certainly undesirable, it does not affect the surface contour or flatness of a rigid sheet. On the other hand, the prior art apparatus will not support a soft sheet on a gaseous cushion such as, for example, a sheet of glass in a plastic state. When a sheet of glass in a plastic state is subjected to such unstable movements the various portions of said sheet do not compensate one for the other as with a rigid sheet. Consequently, such a sheet of glass in a plastic state will form lumps at the points where the viscosity of the glass is weaker, or at points where the pressure is higher, or in the regions where the sheet is accidentally weaker.

The principal object of this invention is to provide a new and improved process and apparatus for supporting a glass sheet without marring said sheet.

Another object of this invention is to provide a new and improved apparatus for supporting a sheet on liquid partitions.

Another object of this invention is to provide a new and improved process of supporting a glass sheet by a static gaseous cushion.

Another object of this invention is to provide a new and improved process of supporting a glass sheet by a dynamic gaseous cushion.

Another object of this invention is to provide a new and improved process of supporting a glass sheet on a gaseous cushion and simultaneously creating a chemical reaction with the surface of the supported glass sheet.

Another object of this invention is to provide a new and improved apparatus for supporting a glass sheet on a plurality of gaseous cushions formed between liquid partitions.

A still further object of this invention is to provide a new and improved apparatus for supporting a glass sheet on a combination of liquid partitions and gaseous cushions.

Further objects and advantages of the present invention will be apparent from the following description of the preferred embodiment described with reference to the accompanying drawings in which.

The process and apparatus according to this invention consists of supporting a sheet of glass, or a similar material, on a gaseous cushion built up in valleys between molten metal partitions resting on a lower solid support. These partitions are formed by placing a suitable liquid in recesses which are formed in the surface of the solid lower support in a predetermined pattern or configuration. The liquid partitions are formed of a molten metal such as tin, lead, aluminium or their alloys. The molten metal has the following characteristics: it will not wet the glass nor the support; and it will not be damaged by any chemical action between it and the gaseous cushion or the glass sheet.

This invention provides homogeneous pressure substantially throughout the area between the sheet and the base support which assures the stability of the sheet over the support and which prevents the sheet from coming into contact with the solid support. The apparatus constructed in accordance with this invention makes possible the supporting and transporting of a sheet of material such as glass while assuring the obtaining or the preservation of the flatness of the sheet. The sheet is supported without contact with any solid support and the surface of the sheet can be raised to a sufficient temperature to insure, by flow, the reabsorption of any superficial defects which could affect the surface of the sheet before it is treated. This apparatus and method provide sheets which are perfectly flat and which possess a natural polish which is known in the glass art as "fire polish."

According to the preferred mode of this invention, the gas forming the gaseous cushion is not confined in a specified area but is permitted to continuously flow between the surface of the base and the glass sheet being supported, in such a manner that a gaseous cushion is formed by the dynamic pressure in the area between the glass sheet and the fixed support. In this embodiment the liquid ledges or rims do not form a closed contour but leave open passages, notably in the lateral regions of the sheet, for the outflow of the gaseous cushion.

Figure 1:
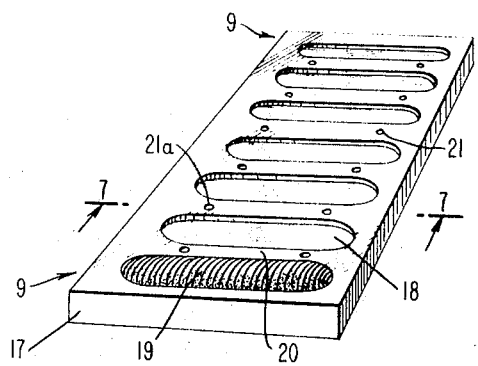
FIG. 1 is a perspective view showing the top of a sheet supporting apparatus wherein the gaseous cushion is not continuously confined between liquid partitions.
Figure 2:
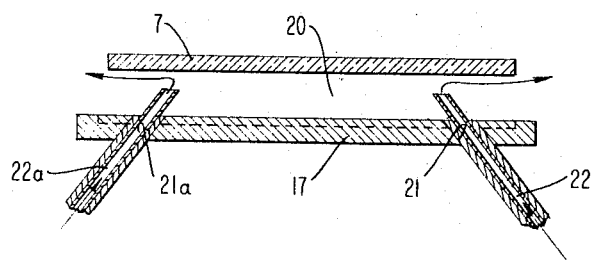
FIG. 2 is a cross sectional view taken along line 2—2 of FIG. 6 showing the means for introducing a gaseous pressure between liquid partitions.
Figure 3:
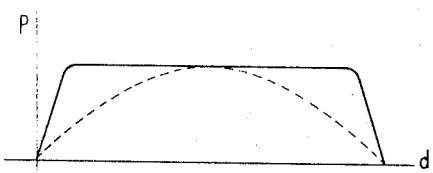
FIG. 3 is a graphic representation of the pressure of the gaseous cushion in the space between the liquid partitions as shown in FIG. 1 plotted against the length of said space.

The preferred inventive concept is realized by means of gaseous cushions which apply a dynamic pressure underneath the glass sheet. Due to the fact that a continual change of gas is inherently utilized when a dynamic pressure supports the sheet it is possible to bring about a chemical reaction between the gas and the sheet simultaneously with the supporting action on the sheet. In accordance with this modification, there is shown in FIG. 1 a solid support 17 having a plurality of parallel spaced apart grooves 18 formed in the top surface thereof. Each of the grooves 18 is filled with the melted metal 4 forming ledges or partitions 19. The melted metal may be tin, lead, aluminium, or their alloys. A gaseous fluid under pressure is admitted into the spaces 20 between each of the parallel and spaced apart ledges 19. Each space 20 has a gaseous fluid supplied to it through apertures 21 and 21a formed in the support 17 as more clearly shown in FIG. 2. Nozzles 22 and 22a extend through apertures 21 and 21a respectively and protrude above the top surface of the support 17 and into each space 20. Nozzles 22 and 22a are positioned at an angle toward the center of each space 20 and toward each other so that the flow of gaseous fluid counteracts the flow of the pressurized gas located in the central space 20. By arranging the nozzles 22 and 22a in this manner, it is possible to maintain a uniform pressure in each space 20. In FIG. 3, there is shown, by the solid curve, a graphic representation of the pressure gradient, resulting from the above-mentioned positioning of the nozzles 22 and 22a, throughout the length of each space 20. The dotted line curve shows the pressure gradient throughout the length of space 20 without the above described positioning of the pressure nozzles. The gas used to form the gaseous cushion is of the type that does not chemically react with the melted metal such as a mixture of carbon monoxide and carbon dioxide or preferably a mixture of nitrogen and hydrogen wherein the ratio of hydrogen is about 5 percent. A chemical that may be used with the gaseous cushion that reacts chemically with the surface of the supported sheet is of the type similar to titanic chloride. This chemical will form an antireflective coating on the surface of the glass.

Figure 4:
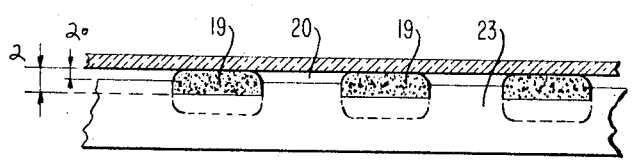
FIG. 4 is a side elevational view taken along lines 4—4 of FIG. 6 showing a modification in the construction of the sheet supporting means.

If the top surface of the support 17 is flat the area at each end of the spaces 20 consists of a large aperture defined by the spacing between the two liquid ledges 19 and by the distance of the supported sheet above the top surface of the support 17. Such a large open area at each end of the space 20 requires a large flow of gas to maintain a sufficient dynamic pressure within each space 20 to support the sheet. To reduce the flow of gas from each of the spaces 20 without reducing the dynamic pressure a step 23 is formed on the top surface of the support 17 at each end of each space 20 and each step extends between the liquid ledges 19 as more particularly shown in FIG. 4.

While the preferred embodiments of the invention have been shown and described in considerable detail, it is to be understood that the invention is not limited to the particular construction or arrangements of parts shown and described, and other form, adaptations, and constructions could be employed which fall within the scope of the appended claims.

What is claimed is:

1. Apparatus for the support of a moving, thermoplastic sheet which comprises a base, a series of elongated liquid supports extending across and projecting above the base, leaving open ended valleys therebetween, and means to fill a valley thereof with gas under pressure sufficient to sustain the sheet between the supports comprising a plurality of pneumatic ports in the valley, on opposite sides of the longitudinal axis of the sheet, angularly directed to deliver their flows of air toward the central portion of the sheet, and means to deliver airflow through the ports in sheet-sustaining quantity.

2. Apparatus according to claim 1 in which the ends of the valleys between the ends of the liquid supports are of reduced cross section whereby to tend to retain the gases within the valleys.

3. A method of supporting a plastic sheet moving in a predetermined path out of contact with solid objects comprising the steps of supporting said sheet on a plurality of unconnected liquid bearings open to the atmosphere, operating by surface tension, and positioned in spaced, predetermined locations in said path, and simultaneously supporting said sheet between said bearings on a gaseous cushion by establishing pneumatic pressure of adequate degree between such liquid bearings by flowing gas against the sheet between the bearings in oppositely directed streams.

4. The method defined in claim 3 wherein the gaseous cushion is at a temperature to fire polish the surface of said sheet.

5. The method defined in claim 3 wherein the gaseous cushion is a mixture of nitrogen and hydrogen, said hydrogen being about 5% of said mixture.

References Cited

UNITED STATES PATENTS

| 3,150,948 | 9/1964 | Gladieux et al. | 65—25 |
| 3,241,937 | 3/1966 | Michalik et al. | 65—65 |

DONALL H. SYLVESTER, *Primary Examiner.*

ARTHUR D. KELLOGG, *Assistant Examiner.*

U.S. Cl. X.R.

65—65, 99, 182; 214—1